United States Patent
Bagasrawala

(10) Patent No.: US 7,143,154 B2
(45) Date of Patent: Nov. 28, 2006

(54) INTERNET PROTOCOL SECURITY FRAMEWORK UTILIZING PREDICTIVE SECURITY ASSOCIATION RE-NEGOTIATION

(75) Inventor: Abbas Bagasrawala, Concord, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1037 days.

(21) Appl. No.: 09/771,406

(22) Filed: Jan. 26, 2001

(65) Prior Publication Data
US 2002/0103887 A1    Aug. 1, 2002

(51) Int. Cl.
*G06F 15/173* (2006.01)
*G06F 15/177* (2006.01)
*G06F 15/16* (2006.01)

(52) U.S. Cl. .................. 709/223; 370/254; 709/226; 709/224; 709/228

(58) Field of Classification Search ............... 709/223
See application file for complete search history.

(56) References Cited

U.S. PATENT DOCUMENTS

| | | | | |
|---|---|---|---|---|
| 5,623,492 A | * | 4/1997 | Teraslinna | 370/397 |
| 5,706,279 A | * | 1/1998 | Teraslinna | 370/232 |
| 5,787,072 A | * | 7/1998 | Shimojo et al. | 370/231 |
| 5,812,525 A | * | 9/1998 | Teraslinna | 370/229 |
| 6,003,060 A | * | 12/1999 | Aznar et al. | 718/103 |
| 6,011,804 A | * | 1/2000 | Bertin et al. | 370/468 |
| 6,023,456 A | * | 2/2000 | Chapman et al. | 370/252 |
| 6,028,840 A | * | 2/2000 | Worster | 370/230 |
| 6,038,217 A | * | 3/2000 | Lyles | 370/233 |
| 6,046,980 A | * | 4/2000 | Packer | 370/230 |
| 6,078,953 A | * | 6/2000 | Vaid et al. | 709/223 |

(Continued)

OTHER PUBLICATIONS

Kunz, Thomas et al. "Fast Detection of Communication Patterns in Distributed Executions." IBM Press. Proceedings of the 1997 conference of the Centre for Advanced Studies on Collaborative Research. Toronto, Ontario. 1997.*

(Continued)

*Primary Examiner*—Jason Cardone
*Assistant Examiner*—Jeffrey R Swearingen
(74) *Attorney, Agent, or Firm*—Matthew J. Hodulik

(57) ABSTRACT

The present invention is a methodology for predicting when current sets of encryption keys used in a high speed data network are about to expire. The invention allows network elements of a communication system to re-negotiate new sets of keys well in advance so as to prevent interruptions in communications traffic flow. In accordance with one exemplary embodiment of the invention, a weighted traffic flow per usage for a given network element is calculated on a periodic basis. The value of the weighted traffic flow per usage is compared with a remainder value of a specific quantity of communications traffic yet to be processed by the network element. If the remainder value is less than the weighted traffic flow value, an indication is given to the appropriate network element to renegotiate a new set of keys.

17 Claims, 3 Drawing Sheets

U.S. PATENT DOCUMENTS

| | | | | |
|---|---|---|---|---|
| 6,084,855 | A * | 7/2000 | Soirinsuo et al. | 370/235 |
| 6,091,725 | A * | 7/2000 | Cheriton et al. | 370/392 |
| 6,137,777 | A * | 10/2000 | Vaid et al. | 370/230 |
| 6,198,722 | B1 * | 3/2001 | Bunch | 370/229 |
| 6,205,119 | B1 * | 3/2001 | Kaczynski | 370/231 |
| 6,292,465 | B1 * | 9/2001 | Vaid et al. | 370/230 |
| 6,320,846 | B1 * | 11/2001 | Jamp et al. | 370/235 |
| 6,330,562 | B1 * | 12/2001 | Boden et al. | 707/10 |
| 6,360,269 | B1 * | 3/2002 | Mamros et al. | 709/228 |
| 6,363,053 | B1 * | 3/2002 | Schuster et al. | 709/227 |
| 6,385,168 | B1 * | 5/2002 | Davis et al. | 370/230 |
| 6,405,251 | B1 * | 6/2002 | Bullard et al. | 709/224 |
| 6,424,624 | B1 * | 7/2002 | Galand et al. | 370/231 |
| 6,452,915 | B1 * | 9/2002 | Jorgensen | 370/338 |
| 6,473,793 | B1 * | 10/2002 | Dillon et al. | 709/223 |
| 6,487,170 | B1 * | 11/2002 | Chen et al. | 370/231 |
| 6,502,131 | B1 * | 12/2002 | Vaid et al. | 709/224 |
| 6,578,077 | B1 * | 6/2003 | Rakoshitz et al. | 709/224 |
| 6,587,680 | B1 * | 7/2003 | Ala-Laurila et al. | 455/411 |
| 6,643,776 | B1 * | 11/2003 | Boden et al. | 713/200 |
| 6,751,663 | B1 * | 6/2004 | Farrell et al. | 709/224 |
| 2002/0010866 | A1 * | 1/2002 | McCullough et al. | 713/201 |

OTHER PUBLICATIONS

Feustel, Edward et al. "The DGSA: Unmet Information Security Challenges for Operating System Designers." ACM Press. ACM SIGOPS Operating Systems Review. vol. 32, Issue 1, New York, NY. 1998. pp. 3-22.*

Ioannidis, Sotiris et al. "Implementing a Distributed Firewall." ACM Press. Proceedings of the 7$^{th}$ ACM Conference on Computer and Communications Security. Athens, Greece. 2000. pp. 190-199.*

Kent, S.et al. RFC 2401: "Security Architecture for the Internet Protocol". The Internet Society, Nov. 1998.*

Feldmann, Anja et al. "Dynamics of IP traffic: A study of the role of variability and the impact of control." Proceedings of the conference on Applications, technologies, architectures, and protocols for computer communications. ACM Special Interest Group on Data Communication. Cambridge, Mass. pp. 301-313. 1999. ACM Press.*

Epsilon, Raja et al. "Analysis of ISP IP/ATM network traffic measurements." ACM SIGMETRICS Performance Evaluation Review. vol. 27, Issue 2. Sep. 1999. pp. 15-24. ACM Press.*

Network Working Group, Request for Comments 2401, Obsoletes 1825, Category: Standards Track, "Security Architecture for the Internet Protocol" S. Kent, BBN Corpo., R. Atkinson @Home Network, Nov. 1998, ftp//ftp.isi.edu/in-notes/rfc2401.txt.

* cited by examiner

INTERNET PROTOCOL SECURITY FRAMEWORK UTILIZING PREDICTIVE SECURITY ASSOCIATION RE-NEGOTIATION

FIELD OF THE INVENTION

The present invention relates generally to the field of securing data using the Internet Protocol Security (IPSEC) framework as proposed by the Internet Engineering Task Force (IETF).

BACKGROUND OF THE INVENTION

To secure data over the Internet, the Internet Engineering Task Force (IETF) has recommended a set of protocols for the Internet Protocol (IP). These suites of secure protocols are referred to as Internet Protocol Security (IPSEC) protocols. IPSEC is a developing standard for security at the network or packet processing layer of network communication. Earlier security approaches had inserted security at the application layer of the communications model. IPSEC is especially useful for implementing virtual private networks and for remote user access through dial-up connection to private networks. A significant advantage of IPSEC is that security arrangements can be handled without requiring changes to individual user computers.

The IPSEC protocols rely on keys to encrypt and decrypt the data. Two parties wishing to exchange data securely using IPSEC exchange IPSEC keys between them. The secure exchange of IPSEC keys is a major factor in determining the security and the integrity of a whole system. Other factors include the strength of crypto-algorithm (DES, 3 DES), procedures, etc.

For large scale deployment of IPSEC and automatic exchange of keys between parties the IETF has defined a key exchange protocol known as the IKE (Internet Key Exchange). The IKE allows two parties to exchange IPSEC keys securely and automatically over the Internet. The IPSEC keys are exchanged by IKE by negotiating Security Associations (SA's) between the two parties. Security Associations (SA's) are simplex connections that afford security services to the traffic being carried. In other words, two sides wishing to communicate using IPSecurity (as defined by the IETF) negotiate and have Security Associations among them. The SA's specify the security parameters that should be used to communicate with the other party. For bi-directional communication, each party typically has two SA's—incoming and outgoing. For added security (to avoid key compromise) and to prevent crypto analysis of the data transferred, RFC 2401 (the IPSEC RFC), recommends that an SA be valid for only a short period of time (e.g. 20 minutes) and that new keys should be exchanged at regular intervals. Accordingly, two parties need to renegotiate another set of security associations (SA's) if they wish to continue the exchange of data after the previous SA expires. The IPSEC RFC recommends two types of units to specify the life of the SA, i.e., time and/or bytes of data transferred. Thus, if the SA life is specified as 10 Mbytes then the two parties can exchange up to 10 Mbytes of data using the current SA. To send more data, the two parties should negotiate another set of SA's for every 10 Mbytes of data.

RFC 2401 specifies the SA life in time and bytes. When a SA life is specified in time units, in order to continue to send data, an initiator system has to renegotiate another set of SA's after the SA lifetime expires. While a new SA is being renegotiated, no data can flow. To prevent data flow interruption, often a system designer anticipates the expiration of a current SA. Before the current SA expires, the initiator system starts renegotiation of new SA's such that new SA's are available as soon as the current SA's expire. This prevents data flow interruptions.

The lifespans of SA's based on time units are relatively easy to renegotiate in advance. This is because the system designer can safely assume the time it might take to negotiate a set of SA's. Based on the time to renegotiate a new SA and the time left before the old SA expires, the system designer can compute the time the system can start new SA negotiations and thus prevent data interruptions. For example, if a current SA expires at T seconds and if it takes 15 seconds to negotiate a set of SA (worst case), then the system can start renegotiation T–15 seconds before the current SA expires and thus preventing data loss/interruptions.

When SA's are specified with life units based on bytes, it is not easy for a system to predict when the SA is going to expire. This is because the data flow is not always uniform. The Internet data flow is bursty in nature. That is, there could be a burst of data flow between the two systems followed by a lull and another burst. Predictability is extremely important in high-speed data communication systems where any interruption in the flow of data occurring due to SA re-negotiation can cause loss of lot of data. A need therefore exists to accurately predicting the expiry of SA's based in bytes.

SUMMARY OF THE INVENTION

The present invention is a methodology for predicting when current sets of encryption keys used in a high speed data network are about to expire. The invention allows network elements of a communication system to re-negotiate new sets of keys well in advance so as to prevent interruptions in communications traffic flow.

In accordance with one exemplary embodiment of the invention, a weighted traffic flow per usage for a given network element is calculated on a periodic basis. The value of the weighted traffic flow per usage is compared with a remainder value of a specific quantity of communications traffic yet to be processed by the network element. If the remainder value is less than the weighted traffic flow value, an indication is given to the appropriate network element to renegotiate a new set of keys.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

Figure 1:
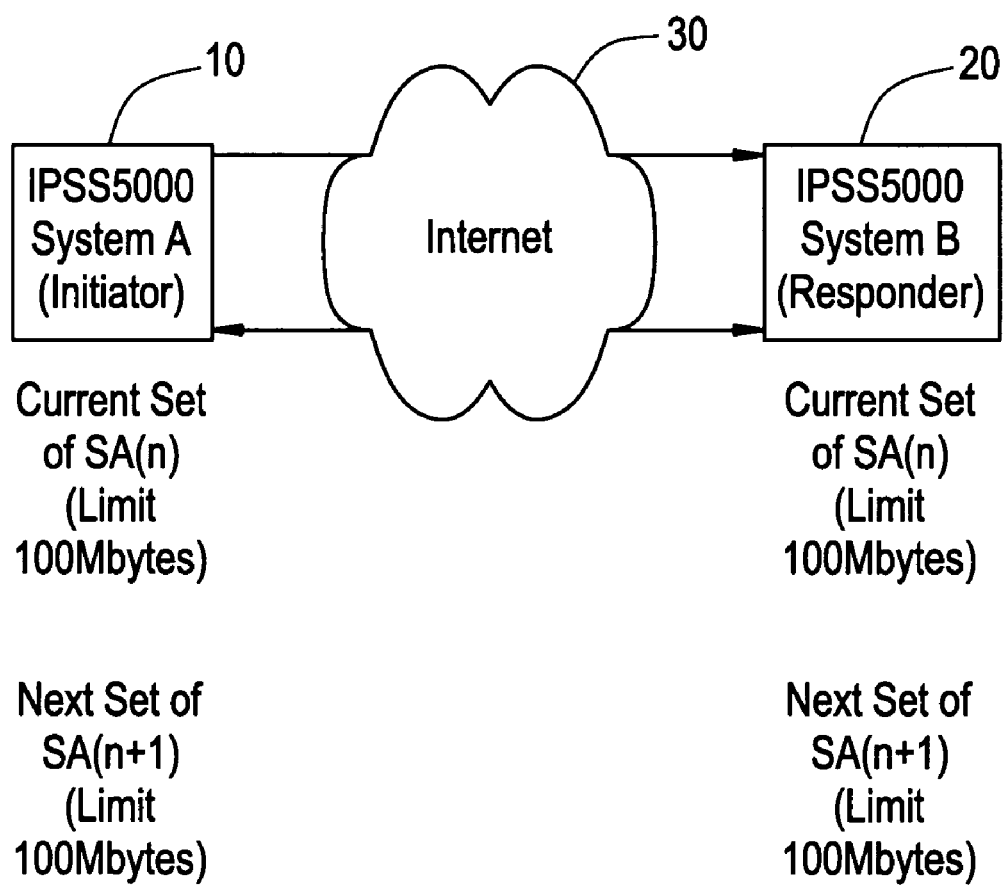
FIG. 1 is an exemplary embodiment of a communication network which makes use of the SA predictive coding algorithm according to the present invention.

FIG. 1 shows two computer systems which couple to one another for communications purposes over the public Internet. Although the present invention is illustrated in the context of a connection over the public Internet, it would be understood that the present invention could be utilized to enhance secure communications connections over substantially any type of communications network. In the exemplary embodiment of FIG. 1, a first endpoint computer system (system A) 10 and a second endpoint computer system (system B) 20 are configured to send data securely using IPSEC over the Internet communications network 30. As discussed in the background, IPSEC is a developing standard for security at the network or packet processing layer of network communication. IPSEC is especially useful in the implementation of virtual private networks and for remote user access through dial-up connection to private networks. A significant advantage of IPSEC is that security arrangements can be handled without requiring changes to individual user computers.

In the embodiment of FIG. 1, system A 10 wishes to send communications traffic to system B 20. Accordingly, system A 10 is considered to be the initiator and system B 20 is considered to be the responder. In accordance with the subject matter of the present invention, the responder (system B) 20 has been configured to negotiate IPSEC keys with a limit, for example, of 100 Mbytes. As the communication progresses, the initiator and the responder negotiate and exchange a set of keys with a limit of 100 Mbytes of data. The keys are discarded once the limit is reached. Thus, if system A 10 wants to continue sending more data to system B 20 beyond the 100 Mbyte limit, then system A 10 has to renegotiate another set of keys with system B 20. This allows system A to send the next 100 Mbytes. It is assumed for the purposes of this discussion that both systems A and B are systems that can renegotiate new keys without causing any interruptions in the traffic flow. Although highly desirable, such capability is not necessary for implementation of the present invention.

For security associations (SA's) limited by an amount of traffic, e.g. bytes, a predictive algorithm in accordance with the present invention is used to evaluate when a new SA should be negotiated in order to avoid an interruption in data flow. A significant advantage of the present invention is that it is accurate and simple to implement without affecting performance of the system. As had been discussed in the background, due to the bursty nature of Internet traffic, it is not enough to compute the average flow of bytes for a given time period. The average method calculates the average number of bytes that were processed by a SA per period For example, if for the SA during period T1 10 Mbytes of data was processed and during period T2 40 Mbytes of data was processed, then the average data processed per period is (10+40)Mbytes/2 periods=25 Mbytes. This is different than an improved measurement technique which is presented in accordance with the present invention.

The improved measurement technique according to the present invention is to compute the average traffic processed per SA usage for a given time period. This is also called weighted traffic flow per usage. This is done by keeping track of how often the SA was used for a given time period and how many bytes were processed in the same period. By taking an average of the number of times the SA was accessed and the average number of bytes per usage a computer system can accurately predict when the SA will expire. This is called the weighted average of SA usage per access. Thus, with respect to the exemplary network of FIG. 1, the initiator system (e.g., system A 10), can renegotiate another set of SA's such that there are no traffic flow interruptions.

Figure 2:
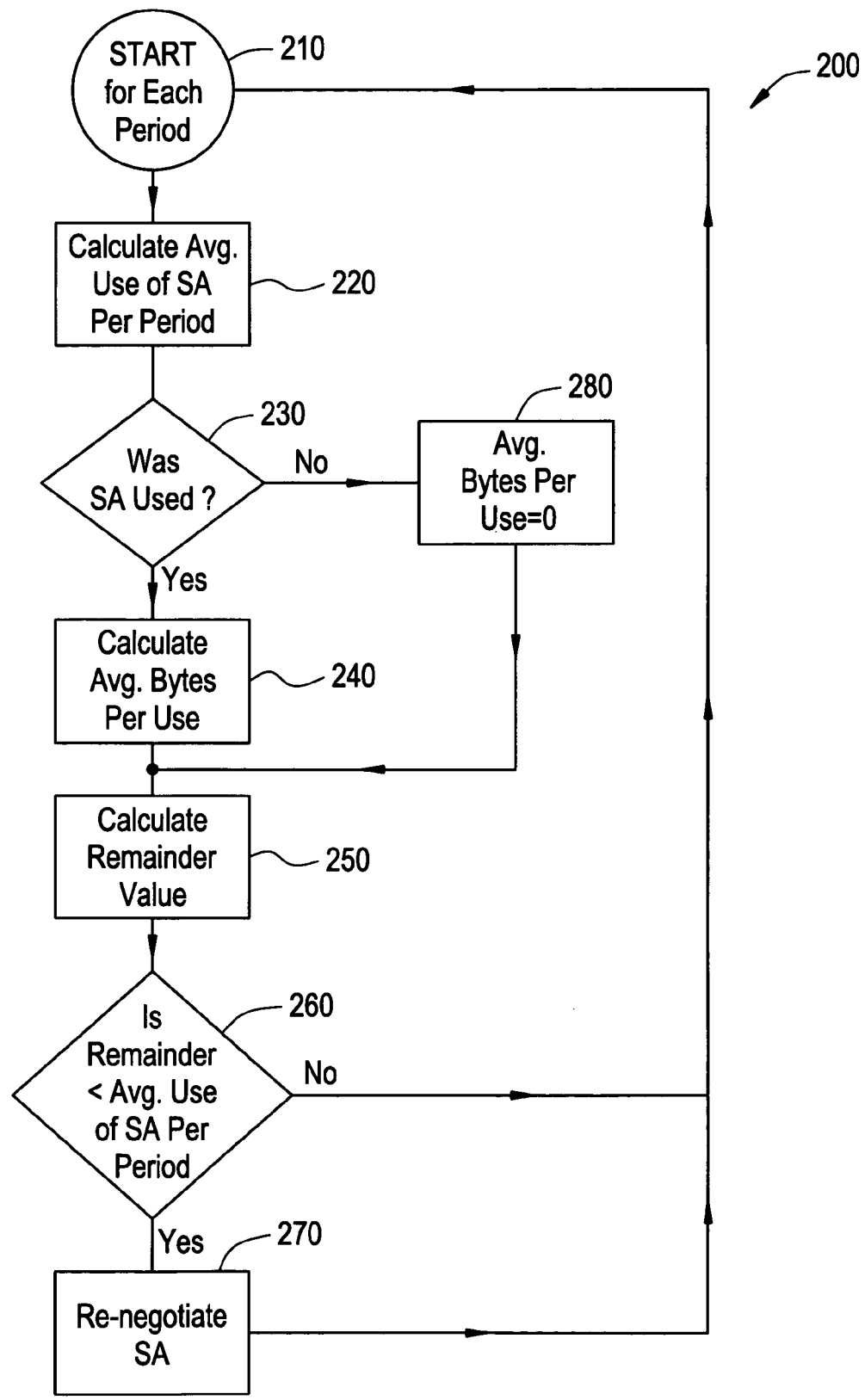
FIG. 2 is an exemplary flow diagram illustrating computation of the SA predictive coding algorithm according to the present invention.

Referring to FIG. 2, an exemplary flow diagram 200 of the present invention for the calculation of the weighted average of SA usage per access is shown. As would be understood by a person skilled in the art, in an exemplary form of the invention, the negotiations would be performed by the endpoint systems, each of which includes a digital processor. As would be understood, the steps of the present invention will be embodied in software stored in memory of the endpoint systems, which is accessible by the digital processor. The invention could also be implemented in hardware, as would be understood.

In accordance with the flow diagram of FIG. 2, certain calculations are performed in accordance with the present invention methodology during every period. The calculation period is selectable according to parameters that would be known by a system's manager of a user system, for example, 15 seconds. A main criterion for selection of the time period is that the time period be smaller than the smallest known time block for transmitting the specified amount of data. This point is illustrated latter in the application by the exemplary calculation. In general, the time period will be chosen so that at least multiple re-negotiation calculations would be accomplished during the span of the smallest known time block. An exemplary time period for a system having a 100 Mbyte SA usage limit for the exemplary system of FIG. 1 may be 15 seconds.

With respect to FIG. 2, after a suitable period has been determined, the calculation begins at the Start box 210. As a first calculation during each time period, at box 220, an average use of a given Security Association is determined. The calculation for average use of SA per period is equal to the total number of times the SA was used divided by the number of periods. The number of periods is counted from the time the SA was first negotiated. This number is updated at least at every increment in period. For example when utilizing 15 second periods, at time T0, the number of periods equals 0. After 15 seconds, the number of periods is 1 and at the end of 30 seconds is 2 and so on.

A decision box 230 is next entered to determine whether the SA has been used during the current period. If the SA was used during the period, the "Yes" path is followed to the next processing box 240. If the SA was not utilized during the current period, the "No" path is followed and the average bytes per use equal zero (box 280). The output of box 280 then loops to the input of box 250. In an alternative embodiment, the program could also loop back toward box 220 to begin another calculation of average use per period.

If the "Yes" path is followed from the decision box, the processing box 240 is entered. A calculation to determine the average number of bytes per use is performed. This value equals the number of bytes processed by SA divided by the number of times the SA was used.

Following the "Yes" path, a computation at processing box 250 is next completed to determine how much "time" remains before another SA must be negotiated. This value, referred to as "Remain" is equal to the SA life in bytes minus the number of bytes processed by the SA. The final calculation of the methodology of FIG. 2 is to determine whether the value of "Remain" is less than the average use of SA per period multiplied by the average bytes per use (value "X"). This comparison takes place at decision box 260. If the value of "Remain" is less than the average use of SA per period multiplied by the average bytes per use (value "X"), then a new SA is to be negotiated with the responder system (box 270). On the other hand, if the value of X is greater than the value of "Remain", the SA predictor feature remains idle or sleeps until the beginning of another calculation in the same period. The calculation will also renew at the beginning of each new period.

The pseudo-code for the SA predictive renegotiation scheme is as follows:

In each period, compute:
    avg_use_of_SA_per_period=number of times SA was used/number of periods.
    IF SA was used then
        avg_bytes_per_use=# of bytes processed by SA/# of times SA was used.
    else
        avg_bytes_per_use=0;

Now compute how much time before we negotiate another SA.
    remain=SA life in bytes−# of bytes processed by the SA
    IF remain< (avg_use_of_SA_per_period*avg_bytes_per_use) then
        negotiate another SA
    ELSE
        Sleep till next time period.

Figure 3:
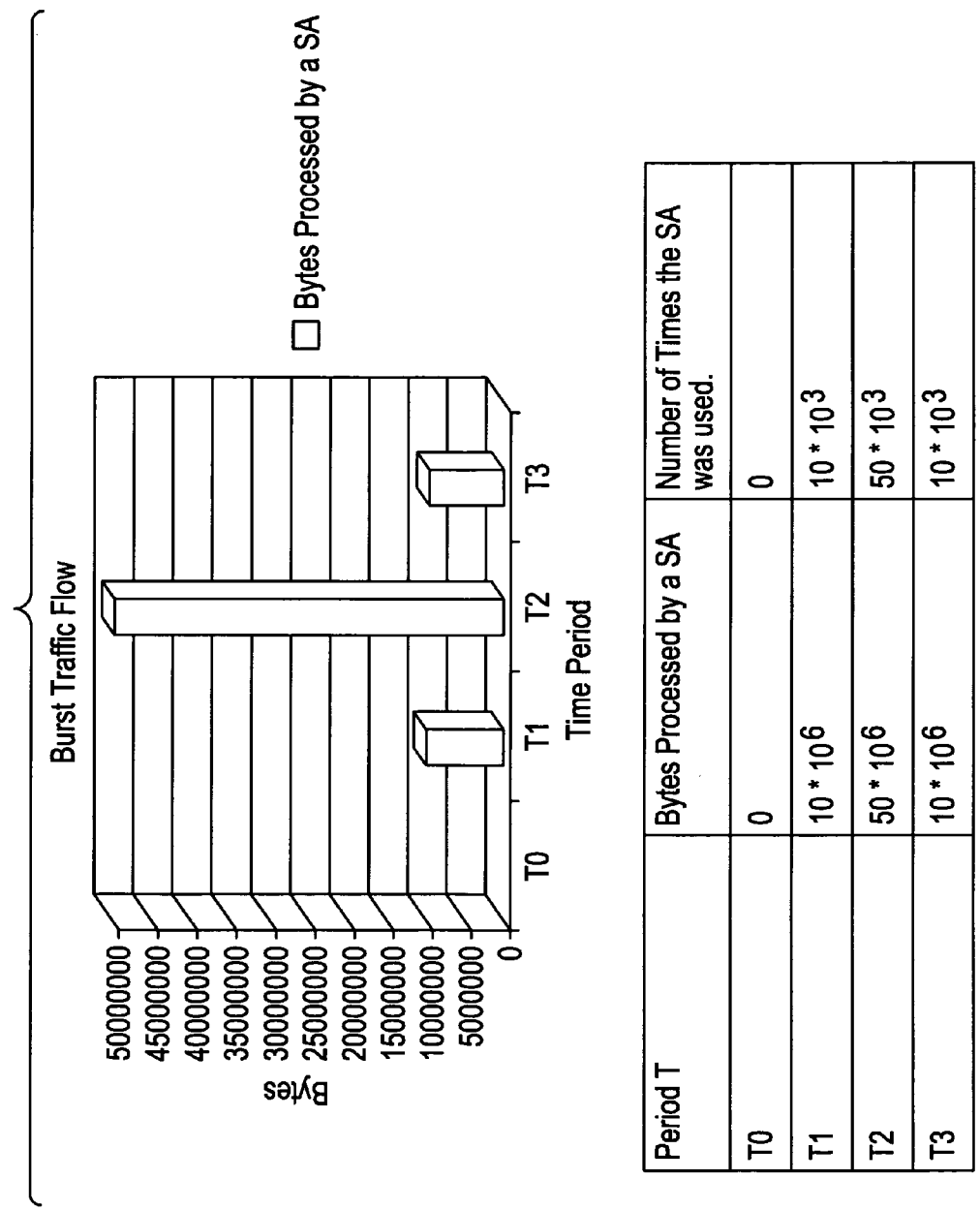
FIG. 3 is a graphic and accompanying table illustrating an exemplary communications traffic flow for use in accordance with the present invention.

In order to further illustrate the present invention, a sample calculation utilizing the methodology of the present invention will be explained in connection with a sample communications flow. Referring to FIG. 3, a graphic illustrating an exemplary burst traffic flow is shown for communications traffic occurring between two endpoints over three different time periods. Within the first period (end of T1), 10 Mbytes are processed. The first period (T1) is followed by a burst of 50 Mbytes during T2. T2 is followed by a lull of 10 Mbytes during T3.

FIG. 3 also illustrates the number of times that the SA is used. Note that the number of times the SA is used is the same as the number of packets processed (encrypted or decrypted) by the SA. Dividing the number of bytes processed by the SA by the packet size derives this number. In practice, the number is updated for each packet that is processed. With regard to the instant calculation, assumptions are made for a packet size of 1000 bytes, and a SA limit of 100 Mbytes ($10^6$ bytes).

Taking the above information into account, it can be seen that for the sample communications flow of FIG. 3, the sample calculations utilizing the methodology of the present invention are as follows:

End of T1 Calculation:

Total Period Tp=1, Total Bytes Tb=$10*10^6$, Total SA Usage Tu=$10*10^3$
1. Avg_use_of_SA_per_period Au=Tu/Tp=$10*10^3$
2. Avg_Bytes_per_use Ab=Tb/Tu=$10^3$
3. Remainder, R=100−10=$90*10^6$
4. Since R>(1)*(2)→No SA is negotiated End of T2 Calculations:

Total Period Tp=2, Total Bytes Tb=$50*10^6$, Total SA Usage Tu=$50*10^3$
1. Avg_use_of_SA_per_period Au=Tu/Tp=$25*10^3$
2. Avg_Bytes_per_use Ab=Tb/Tu=$10^3$
3. Remainder, R=100−50=$50*10^6$
4. Since R>(1)*(2)→No SA is negotiated End of T3 Calculations:

Total Period Tp=3, Total Bytes Tb=$60*10^6$, Total SA Usage Tu=$60*10^3$
1. Avg_use_of_SA_per_period Au=Tu/Tp=$20*10^3$
2. Avg_Bytes_per_use Ab=Tb/Tu=$3*10^3$
3. Remainder, R=100−60=$40*10^6$
4. Since R<(1)*(2)→A new SA is negotiated Based on the above, it can be seen that a new SA is negotiated at the end of period T3. It should be noted that for the same traffic pattern, but instead using the "average bytes" method, no SA would have been negotiated at the end of T3. If in T4 period a burst of traffic of 50 Mbytes was received then the SA would expire (limit of 100 Mb) and thus a new SA would have to be negotiated which would result in loss of data while a new SA is negotiated. Accordingly, a significant advantage of the present invention of prior art methodologies is illustrated.

The present invention predictive SA renegotiation algorithm is accurate in predicting the SA expire time on different types of traffic, e.g., continuous steady stream of data (constant bandwidth) and/or bursty data patterns. A unique feature of the SA predictive algorithm is its accuracy and simplicity without affecting the performance of the system. The present invention predictive algorithm is also independent of the crypto-algorithm used for encrypting the traffic.

The SA predictive algorithm can be used in all systems supporting secure traffic using IPSEC standards. The algorithm is independent of the crypto-algorithm used in encrypting the traffic itself. The algorithm is also generic such that it can be used in traffic prediction especially in burst traffic common to the Internet.

The present invention methodology has other applications of use, besides IPSEC applications over the public Internet. Examples of other possible applications include Traffic Monitoring and Network Management Applications. Traffic management applications can use the predictive algorithm to predict and identify randomly occurring patterns. For example, the number of telephone calls or highway traffic pattern. Network Management Applications can use the predictive algorithm to monitor data and predict usage of network components. For example, if a modem banks are deployed to accept calls which are arriving randomly, then using the present invention, the application can predict when the modem banks will be saturated and can automatically add additional capacity.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims.

What is claimed is:

1. An apparatus for use in predicting exchanges of a specific quantity of communication traffic between network elements, said apparatus comprising:
   a digital processor operable on a periodic basis to calculate a weighted traffic flow per usage for a given network element, wherein said weighted traffic flow per usage corresponding to an average use of a network element per period multiplied by an average communications traffic quantity per use, said digital processor further including,
   a comparison mechanism for comparing a value of said weighted traffic flow per usage with a remainder value of said specific quantity of communications traffic, wherein an indication is given by said network element if said remainder value is less than said weighted traffic flow.

2. The apparatus of claim 1, wherein said digital processor waits until beginning another time period to calculate another value of said weighted traffic flow per usage to be compared with an updated remainder value.

3. The apparatus of claim 1, wherein said specific quantity of communications traffic corresponds to a quantity value associated with a security association (SA) between said network elements.

4. The apparatus of claim 3, wherein said indication given from said network elements prompts renegotiation of another SA.

5. The apparatus of claim 3, wherein said SA is an Internet Protocol Security (IPSEC) SA.

6. The apparatus of claim 1, wherein said apparatus is used in connection with a communications traffic monitoring application to identify randomly occurring traffic patterns.

7. The apparatus of claim 1, wherein said apparatus is used in connection with a communications network management application to monitor usage of network components.

8. A method of predicting exchanges of a specific quantity of communication traffic between network elements, said method comprising:
   calculating, on a periodic basis, a weighted traffic flow per usage for a given network element, said weighted traffic flow per usage corresponding to an average use of a network element per period multiplied by an average communications traffic quantity per use;
   comparing a value of said weighted traffic flow per usage with a remainder value of said specific quantity of communications traffic; and
   giving an indication from said network element if said remainder value is less than said weighted traffic flow.

9. The method of claim 8, further including waiting until beginning another time period to calculate another value of said weighted traffic flow per usage to be compared with an updated remainder value.

10. The method of claim 8, wherein said specific quantity of communications traffic corresponds to a quantity value associated with a security association (SA) between said network elements.

11. The method of claim 10, wherein said indication given from said network elements prompts renegotiation of another SA.

12. The method of claim 10, wherein said SA is an Internet Protocol Security (IPSEC) SA.

13. The method of claim 8, wherein said method is used in connection with a communications traffic monitoring application to identify randomly occurring traffic patterns.

14. The method of claim 8, wherein said method is used in connection with a communications network management application to monitor usage of network components.

15. The method of claim 8, wherein at least a portion of said communications traffic flows between network elements over the public Internet.

16. A method of predicting expiration of quantity based security associations between network elements, at least a portion of communications traffic exchanged between said network flowing over the public Internet, said method comprising:
   calculating, on a periodic basis, a weighted traffic flow per usage for a given network element, said weighted traffic flow per usage corresponding to the average use of a security association per period multiplied by the average number of bytes processed per use;
   comparing a value of said weighted traffic flow per usage with a remainder value of one of said quantity based security associations; and
   renegotiating another security association with a corresponding one of said network elements if said remainder value is less than said weighted traffic flow.

17. The method of claim 16, wherein said security association is an IPSEC security association.

* * * * *